Dec. 4, 1923.

H. KELLY 1,476,256

AUTOMOBILE ROAD MAP HOLDER

Filed Nov. 27, 1922

Inventor
Harry Kelly.
By [signature]
Attorney

Patented Dec. 4, 1923.

1,476,256

UNITED STATES PATENT OFFICE.

HARRY KELLY, OF DENVER, COLORADO, ASSIGNOR OF ONE-HALF TO JOHN F. MATHIAS, OF DENVER, COLORADO.

AUTOMOBILE ROAD-MAP HOLDER.

Application filed November 27, 1922. Serial No. 603,531.

*To all whom it may concern:*

Be it known that I, HARRY KELLY, a citizen of the United States, residing at Denver, in the city and county of Denver and State of Colorado, have invented certain new and useful Improvements in Automobile Road-Map Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to holders for automobile road maps.

Touring by automobile has become very common today and it is very common for automobile parties to take long trips into parts of the country with which they are unacquainted. In order to be able to arrive at the desired point of destination, it is, of course, necessary that the proper roads shall be traversed and this is made possible by the use of road maps. Road maps of different forms and sizes are available for the tourist, but they are usually in the form of books or large sheets that cannot be consulted without stopping the car for a close examination.

It is the object of this invention to provide a new and improved road map and a holder therefor, by means of which the map can be secured in place on the steering post or other part of the automobile so that the map can be readily seen at all times in order that the driver may constantly have before him a map of the road.

The holder is so constructed that the map can be readily moved so as to expose different sections thereof to view.

My map is made in the shape of a long, narrow band on which the different routes are shown in the usual way. The holder has two spaced parallel spools or rollers to which the ends of the map are connected so that it can be rolled from one to the other like a scroll, thus exposing to view different parts of the map.

In order to more clearly describe my invention, I shall have reference to the accompanying drawings in which—

The same reference numbers will be used to designate the same parts throughout the several views.

Figure 1:
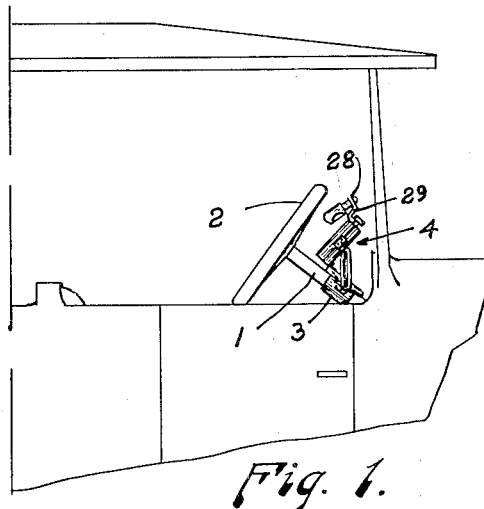
Fig. 1 is a side elevation of a portion of an automobile showing my improved map holder in place on the steering post.
Figure 2:
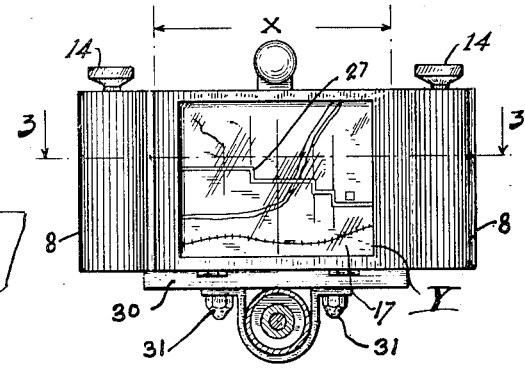
Fig. 2 is a front elevation of my holder.
Figure 3:
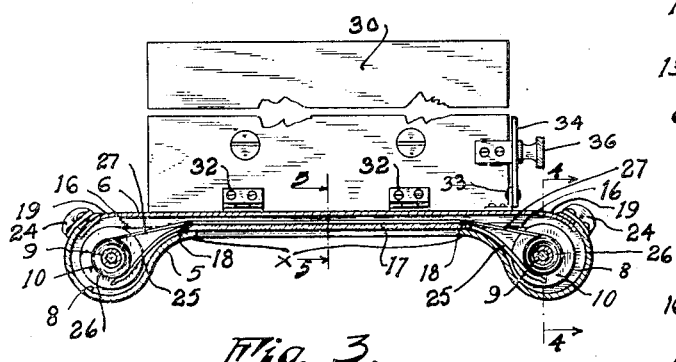
Fig. 3 is a section taken on line 3—3, Fig. 2.
Figures 4, 5:
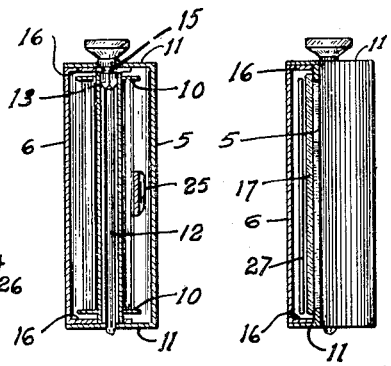
Fig. 4 is a section taken on line 4—4, Fig. 3.
Fig. 5 is a section taken on line 5—5, Fig. 3.
Figure 7:
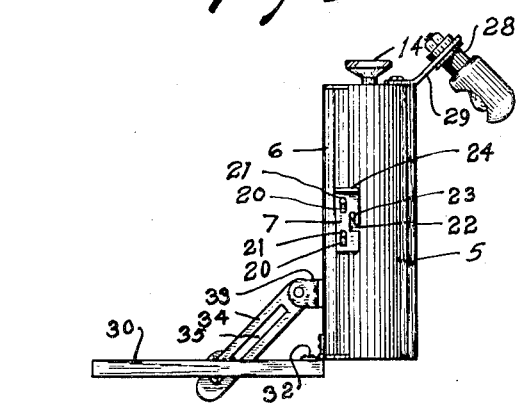
Fig. 7 is an end view looking in the direction of the arrow in Fig. 3.
Figure 6:
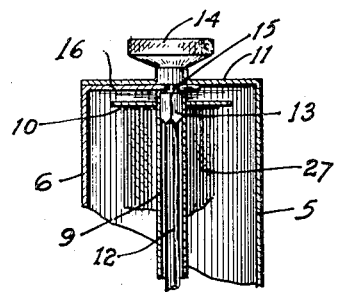
Fig. 6 is a partial section taken on line 4—4, Fig. 3, but to an enlarged scale.

In Fig. 1, numeral 1 represents the steering wheel. Secured to the steering post by any suitable means such as a strap 3 is my improved map holder, which I shall indicate as a whole by numeral 4. My improved holder consists of a metal casing formed by a front portion 5 and a rear portion 6, secured together by suitable locking means 7. The front portion 5 is provided at each end with a cylindrical cavity 8 for the reception of spools which consist of a tubular central portion 9 and end flanges 10, whose entire length is slightly less than the distance between the ends 11 which are each provided with an opening located at the center of the cavity and adapted to receive the key 12 which passes through the tube 9 and serves as a means by which the spool is rotated. The upper end of tube 9 is squared so as to co-operate with the square portion 13 of the key. Directly above the squared portion 13, between it and the bottom of the head 14, there is a part 15 (Fig. 6) of smaller diameter which receives the edge of the flange 16 and serves to lock the key against withdrawal. Between the cylindrical cavities 8 there is a flattened portion X which has a rectangular opening Y cut therein as shown in Fig. 2. A piece of glass 17 is secured to the rear side of the flattened portion X by means of members 18 which form means for holding the glass in place (Fig. 3). The rear portion 6, which forms a cover for the front part, has its ends curved, as indicated at 19 so as to co-operate with the curved sides of the cylindrical cavities 8 to enclose the spools in the manner shown in Fig. 3. Portion 6 is also provided along its sides with flanges 16 which fit inside the end walls 11 in the manner indicated in Figs. 4, 5 and 6. The upper flange 16 has near each end a widened portion which engages the notch 15 in the manner hereinbefore described. The two parts 5 and 6 are held together by means of locks 7 which may be of any suitable design, but which I have shown as consisting of a plate having a pair of spaced elongated holes which co-operate with rivets 21 for slidably securing the plate to the rear portion 6. The other side of the plate has a notch 22 which co-operates with a rivet 23 secured to the front part 5. When the lock is in the position shown in Fig. 7, the parts 5 and 6 are held together. An end 24 of each lock plate is bent outwardly to serve as a handle by means of which it can be moved. Springs 25 are secured to the part 5 and rest against the paper on the spools so as to serve as a brake, all as shown in Fig. 3. In order to conveniently attach the ends of the map to the spools, the tubular members 9 are provided with some suitable spring clips 26 which will hold the ends in place.

The map 27 is made in the form of a long strip whose width is about equal to the length of the spool and it passes from one spool to the other through the space between parts 5 and 6, and the markings on the map can be plainly seen through the glass plate 17 in the manner shown in Fig. 1. A lamp 28 is supported by a bracket 29 in such a position that it will illuminate the map for night driving. In order to secure the holder to the steering post, I provide a board or plate 30 with two bolts 31 by means of which it is clamped securely to the steering post. The rear portion 6 is secured at its lower edge to the board 30 by means of hinges 32. A small bracket 33 is secured to plate 6 and pivoted to this is a bar 34 having a slot 35 which co-operates with a bolt 36 to retain the holder in any desired angular position with respect to board 30.

The holder is mounted on the steering post and adjusted to the most convenient position. Knobs 14 are then rotated so as to move the proper part of the map into position. If a different portion of map is desired, it can readily be made visible through turning of the spools. It is my intention to provide maps for various routes. These can be sold on spools in the same manner as camera films.

It is evident from the foregoing, that I have invented a convenient holder for automobile maps, which holder can be cheaply made and easily assembled, and when in place on a car will enable the driver to have constantly before him a road map of the country over which he is traveling.

Having now described my invention, what I claim as new is:

A map holder comprising in combination a casing having a cylindrical chamber at each end thereof, a spool removably mounted for rotation in each of said chambers, a removable spindle passing through openings in said casing and through said spool, said spindle having a non-rotatable connection with the spool whereby the latter may be rotated by rotating the spindle, a cover for said casing, means on the cover for cooperating with means on the spindles for preventing removal of the latter while the cover is in place, an opening in said casing intermediate the cylindrical chambers, a ribbonlike map adapted to be moved past said opening, said map having one end attached to each spool.

In testimony whereof I affix my signature.

HARRY KELLY.